(12) United States Patent
Hipshier

(10) Patent No.: US 7,954,871 B2
(45) Date of Patent: Jun. 7, 2011

(54) TRANSPARENT/TRANSLUCENT FLEXIBLE COMPONENT FOR A VEHICLE INTERIOR

(75) Inventor: Jason M. Hipshier, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/582,878

(22) Filed: Oct. 21, 2009

(65) Prior Publication Data

US 2010/0045060 A1    Feb. 25, 2010

Related U.S. Application Data

(63) Continuation-in-part of application No. 11/943,283, filed on Nov. 20, 2007.

(60) Provisional application No. 61/107,167, filed on Oct. 21, 2008, provisional application No. 61/112,884, filed on Nov. 10, 2008.

(51) Int. Cl.
*B60J 1/20* (2006.01)
(52) U.S. Cl. .................... 296/24.34; 296/37.8
(58) Field of Classification Search ............... 296/24.34, 296/37.8
See application file for complete search history.

(56) References Cited

U.S. PATENT DOCUMENTS

| 6,406,169 | B1 | 6/2002 | Munsey |
| 7,201,432 | B2 | 4/2007 | Roth |
| 7,475,954 | B1 * | 1/2009 | Latunski ................. 312/297 |
| 2006/0037713 | A1 | 2/2006 | Ichimaru et al. |
| 2006/0186696 | A1 | 8/2006 | Dobos et al. |
| 2007/0056693 | A1 * | 3/2007 | Szebeni ............. 160/168.1 V |
| 2008/0129071 | A1 | 6/2008 | Hipshier et al. |

FOREIGN PATENT DOCUMENTS

| DE | 40 10241 A1 | 4/1991 |
| DE | 10 2005 023 062 B3 | 10/2006 |
| EP | 1 777 109 B1 | 4/2007 |
| JP | 3 68474 A | 3/1991 |

* cited by examiner

*Primary Examiner* — Joseph D Pape
(74) *Attorney, Agent, or Firm* — Dickinson Wright PLLC

(57) ABSTRACT

A trim component for a vehicle includes a flexible component, and at least a portion of the flexible component is translucent or transparent, allowing light to pass therethrough. The flexible component could also include an opaque portion. The trim component may be a tambour door of a center console or other storage area, a gear shift closeout, or a steering column closeout. The flexible component includes a plurality of slats and a substrate coupling the slats. The center console includes a light source directing light through the translucent portion of the tambour door. The slats are formed from polypropylene or polycarbonate acrylonitrile butadiene styrene, and the substrate is formed from thermoplastic polyurethane or a thermoplastic elastomer.

12 Claims, 4 Drawing Sheets

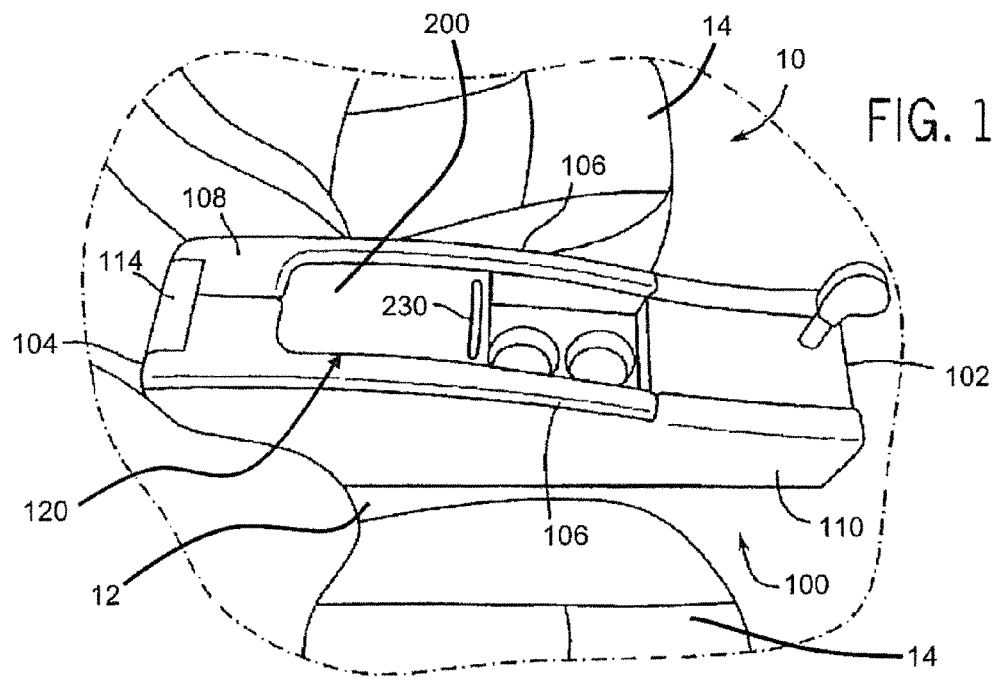
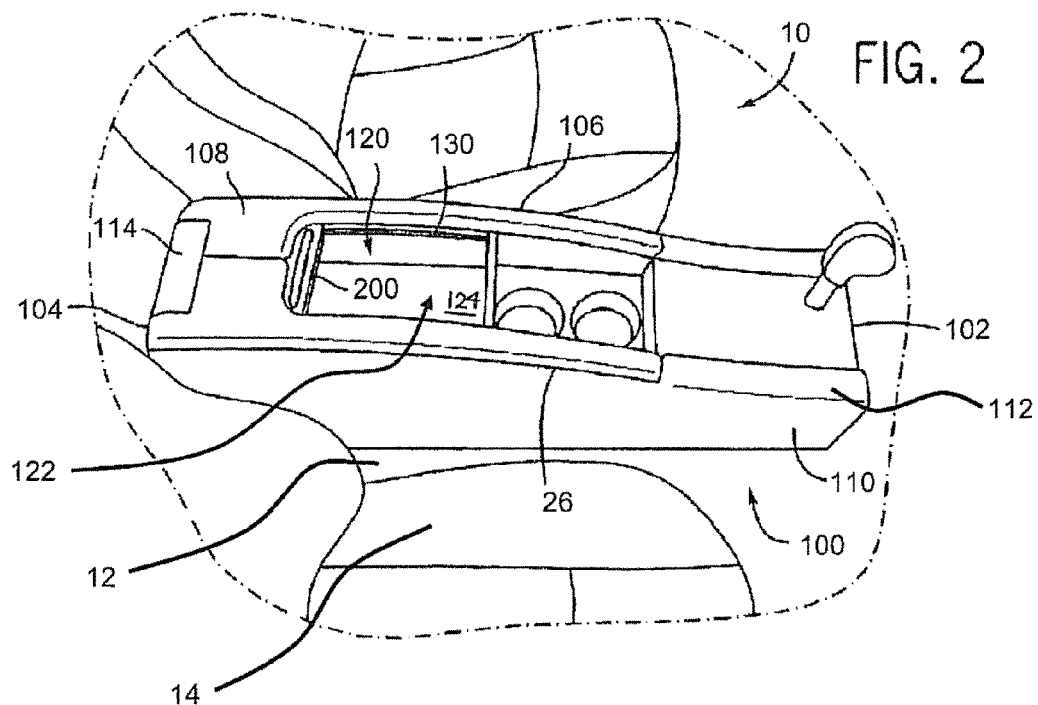

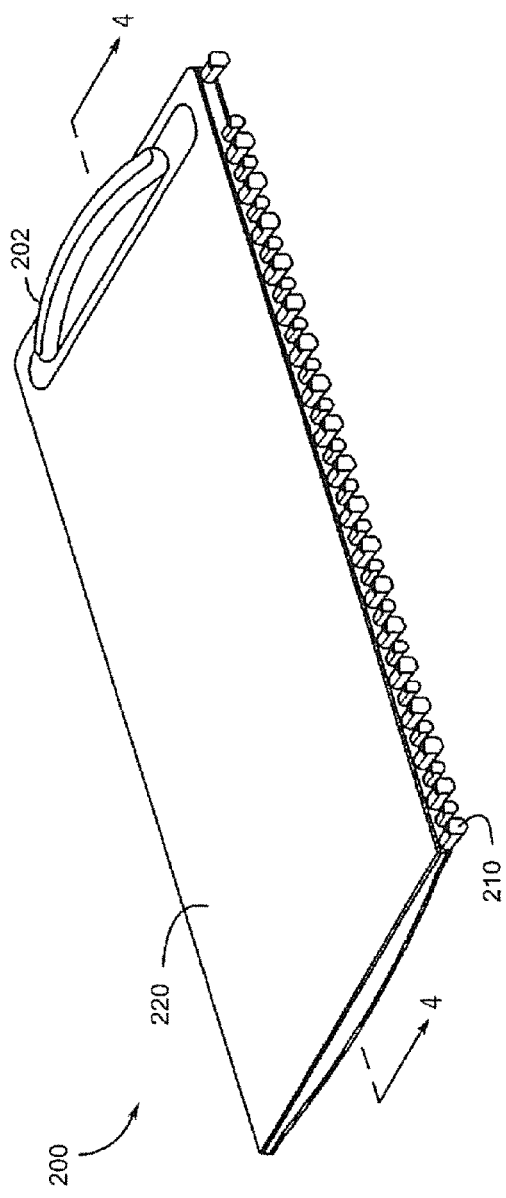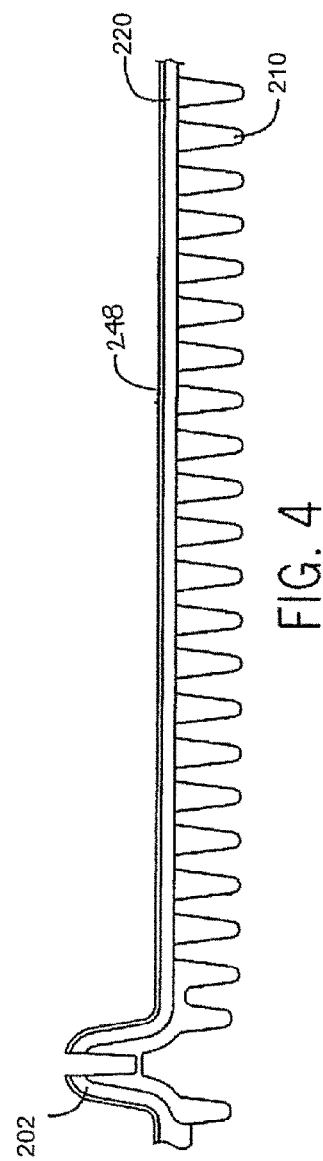

TRANSPARENT/TRANSLUCENT FLEXIBLE COMPONENT FOR A VEHICLE INTERIOR

CROSS REFERENCE TO RELATED APPLICATION

This application is a continuation-in-part of U.S. application Ser. No. 11/943,283 filed Nov. 20, 2007. This application also claims the benefit of U.S. Provisional Application Ser. No. 61/107,167, filed Oct. 21, 2008, which claims the benefit of U.S. Provisional Application Ser. No. 61/112,884, filed Nov. 10, 2008. The disclosures of all applications are incorporated herein by reference in their entirety.

BACKGROUND OF THE INVENTION

1. Field of the Invention

This invention relates to a trim component for a vehicle.

2. Description of the Prior Art

Passenger compartments of automotive vehicles typically include center consoles between front seats of the vehicle. The consoles can be configured as a storage area and/or an arm rest area. Likewise, other storage structures can be provided in other locations throughout the interior of a vehicle. For example, map pockets and door pockets can be provided on or around the seats of the vehicle and/or storage structures can be provided in an overhead console, center stack, dashboard, instrument panel and/or the like. Such consoles and storage structures can further have doors to selectively close a storage area provided within the console or storage structure. For example, an articulated or flexible door, known in the art as a tambour door, can be used in a console or storage structure to close an opening of a storage area.

Tambour doors are particularly useful for closing an opening having a non-linear profile, because tambour doors can ride on tracks or rails that follow the non-linear profiles of the opening. Typically, tambour doors include multiple slats or segments that fit into and ride on the tracks or rails. Tambour doors may be used in other vehicle trim applications, such as a steering column closeout or gear shift closeout.

SUMMARY OF THE INVENTION AND ADVANTAGES

The subject invention provides a trim component for a vehicle including a flexible component. At least a portion of the flexible component is translucent. The translucent portion of the flexible component allows light to pass therethrough, which may assist a passenger of the vehicle in locating the flexible component at night. The translucent portion of the flexible component may be transparent, allowing a passenger of the vehicle to clearly view objects on the other side of the flexible component. Further, the subject invention impacts the aesthetic appearance of the passenger compartment of the vehicle. The flexible component may be used as a trim component for a vehicle, such as a door to selectively open and close a storage area of the passenger compartment. The flexible component may also be used as another trim component, such as a steering column closeout or gear shift closeout.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is an isometric pictorial view of a console for a vehicle showing a flexible component, wherein the flexible component is a door in a closed configuration;

FIG. 2 is an isometric pictorial view of the console in FIG. 1 showing the door in an open configuration;

FIG. 3 is an isometric view of an articulated tambour door according to an exemplary embodiment;

FIG. 4 is a section view of the door in FIG. 3 taken along the line 4-4;

DETAILED DESCRIPTION OF THE INVENTION

Figure 5:
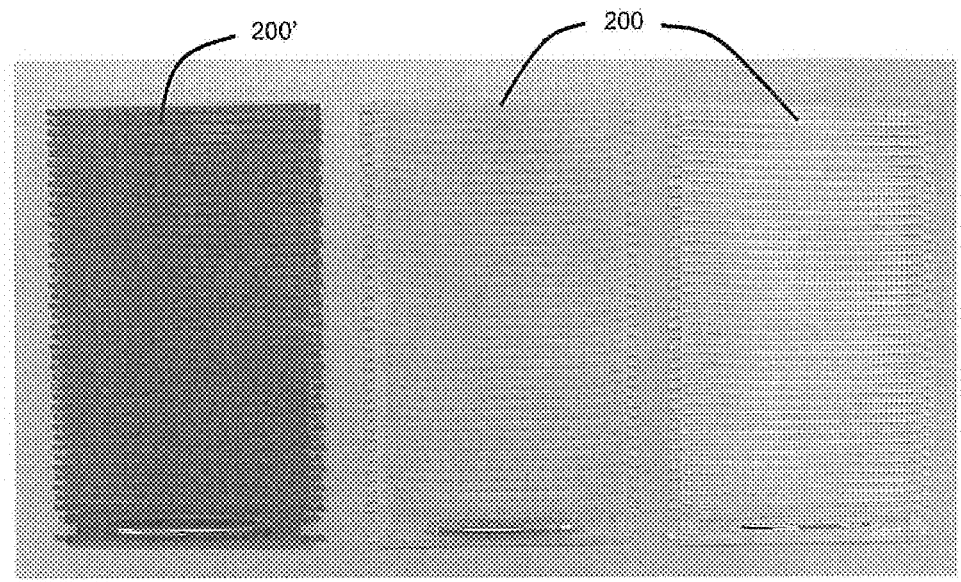
FIG. 5 is a photograph of three tambour doors according to exemplary embodiments showing the doors in a first lighting configuration.

It should be appreciated that, while the following disclosure of various exemplary embodiments of a flexible component 200 according to this invention are directed to a tambour door of a floor console, the flexible component 200 could be applied to other trim components for a vehicle, such as a steering column closeout, a gear shift closeout, or a door to another storage area.

FIGS. 1 and 2 show one exemplary embodiment of a console 100 for a vehicle 10. The console 100 can be coupled to a vehicle floor 12 between two seats 14 or in any other suitable location. According to this exemplary embodiment, the console 100 is configured to provide a storage area and an armrest for an occupant of one or both of the seats 14. The console 100 can be a generally prismatic structure with a front wall 102, a rear wall 104, two opposed and generally symmetrical side walls 106 and a top surface 108.

The console 100 may also include two side panels 110. The side panels 110 can form the main body of the console 100. In this case, each side panel 110 provides one of the side walls 106 of the console 100 and portions of the rear wall 104, the front wall 102 and the top surface 108. The side walls 106 can have an upper contour that is a compound curve having both convex and concave portions, such that each side wall 106 is substantially higher adjacent to the rear wall 104 than it is adjacent to the front wall 102. The top edges 112 of the side panels 110 form the curved top surface 108. The top surface 108 includes an opening 120 that allows a user to access an interior space 122 of the console 100. At least one inner partition or insert 124 can be provided in the interior space 122 of the console 100, and can include one or more of each of a partition, a bin, a liner, and/or the like. The console 100 can also include a rear panel 114. The rear panel 114 can form a portion of the rear wall 104 and/or the top surface 108.

The console 100 includes the flexible component 200, such as, for example, a door, configured to close the opening 120 in the console 100. The flexible component 200 may be selectively moved over and within a predetermined area, such as the opening 120 in the console 100. Because of the curved nature of the top surface 108, the flexible component 200 preferably is a flexible or articulated door. According to an exemplary embodiment, the flexible component 200 is a tambour door and rides on a set of tracks or rails 130. The tracks or rails 130 can have, for example, a C-shaped cross section and may be coupled to the side panels 110 or integrally formed within the side panels 110.

FIGS. 3 and 4 show the flexible component 200 separate from the console 100. As shown in FIGS. 3 and 4, the flexible component 200 has a plurality of narrow segments, elements or slats 210 and, as shown in FIGS. 1 and 2, is configured to follow the tracks or rails 130 on a path that may follow the upper contour of the side walls 106. As shown best in FIG. 3, the flexible component 200 includes a flexible substrate 220 that couples together and supports the slats 210 and provides an outer surface. The substrate 220 may also provide an inner surface of the flexible component 200.

As stated above, the flexible component 200 may be selectively moved over and within a predetermined area, which renders the flexible component 200 useful in other vehicle trim applications, in addition to its use in the console 100. For example, the flexible component 200 may be used as a steering column closeout, in which case the flexible component 200 is selectively moved within a predetermined area adjacent the steering column. The flexible component 200 may also be used as a gear shift closeout, in which case the flexible component 200 is selectively moved within a predetermined area adjacent the gear shift. The flexible component 200 may also be used as a cover or door to various other storage areas or spaces in the vehicle interior. The flexible component 200 may include a single element, additional elements, or multiple other elements, allowing movement of the flexible component 200 over and within a predetermined area of the vehicle interior, instead of, or in addition, to the slats 210 and substrate 220.

Additionally, at least a portion of the flexible component 200 is translucent, allowing light to pass therethrough. The translucent portion of the flexible component 200 may be transparent, allowing light to pass through with little or no distortion so that objects on the other side of the transparent portion can be seen. In an exemplary embodiment, wherein the flexible component 200 includes the slats 210 and substrate 220, at least a portion of one of the slats 210 or a portion of the substrate 220 is translucent. The remaining portions of the flexible component 200 may be opaque. For example, in various exemplary embodiments, each of the slats 210 are translucent, while a portion of the substrate 220 is opaque. In other various exemplary embodiments, each of the slats 210 are opaque, while the substrate 220 is translucent. In other exemplary embodiments, each of the slats 210 and the substrate 220 are both translucent. In another exemplary embodiment, a portion of the substrate 220 is opaque and another portion of the substrate 220 is translucent. Further, a subset of one or more of the slats 210 may be translucent, while any of the remaining slats 210 may be opaque. In addition, a portion of one of the slats 210 may be translucent while another portion of the same slat 210 is opaque. The opaque portions of the flexible component 200 may be adjacent to the translucent portions or surround the translucent portions to direct light through the translucent portions or to provide an aesthetic design for light to shine through.

The flexible component 200 may be formed from or include a variety of materials including, but not limited to, polypropylene (PP), polycarbonate acrylonitrile butadiene styrene (PC/ABS), thermoplastic polyurethane (TPU), thermoplastic elastomers (TPE), and other thermoplastic polymers. The flexible component 200 may also be formed from any other suitable known or later-developed materials. Further, the flexible component 200 may be formed from a single material or several different materials. For example, the slats 210 may be formed from a PP or PC/ABS material, and the substrate 220 may be formed from a TPU or TPE material. In one embodiment, the slats 210 are formed from PP, and the substrate 220 is formed from TPE. In another embodiment, the slats 210 are formed from PC/ABS, and the substrate 220 is formed from TPU. The slats 210 and the substrate 220, however, may be formed from a common material, i.e. the same material.

The flexible component 200 may include additional layers, such as a flexible layer 248, as shown in FIG. 4. The flexible component 200 may also include, an ink layer, and/or a top coat layer, as outlined in the incorporated U.S. application Ser. No. 11/943,283 application. Such additional layers may be translucent and/or opaque and may alter the appearance of the substrate 220 or other components of the flexible component 200. For example, the flexible component 200 may include an ink layer that provides an opaque design on top of the otherwise translucent flexible component 200. The flexible component 200 may also include a handle or protrusion 202 on one end that allows a user to more easily grasp and manipulate the flexible component 200. According to other exemplary embodiments, the flexible component 200 may include a depression, recession or opening to allow a user to more easily grasp and manipulate the flexible component 200.

Figure 6:
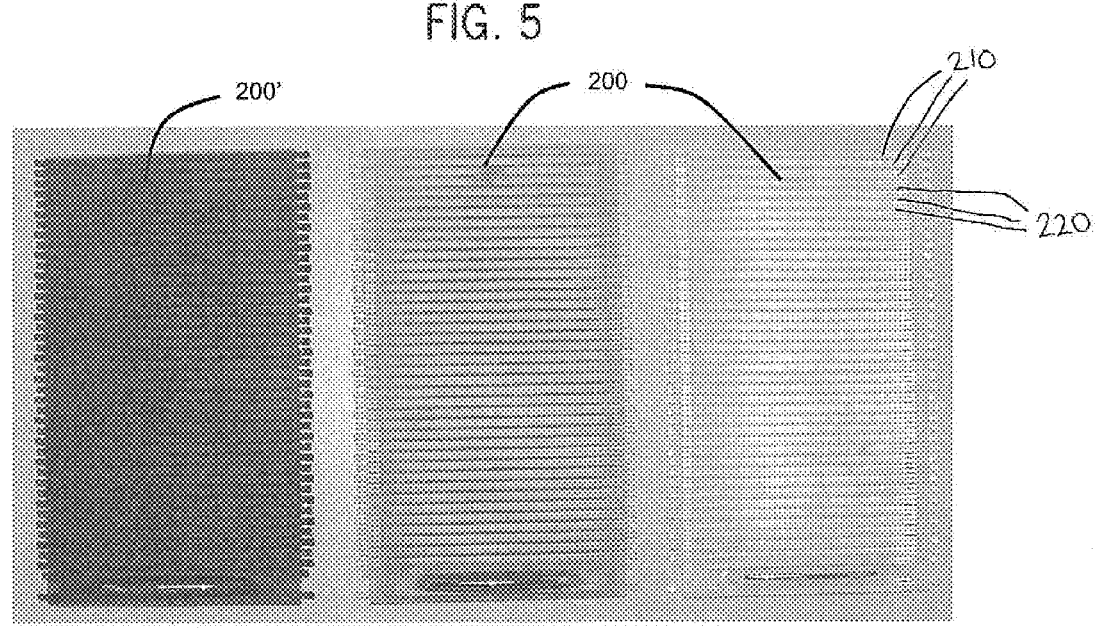
FIG. 6 is a photograph of three tambour doors according to exemplary embodiments showing the doors in a second lighting configuration.
Figure 7:
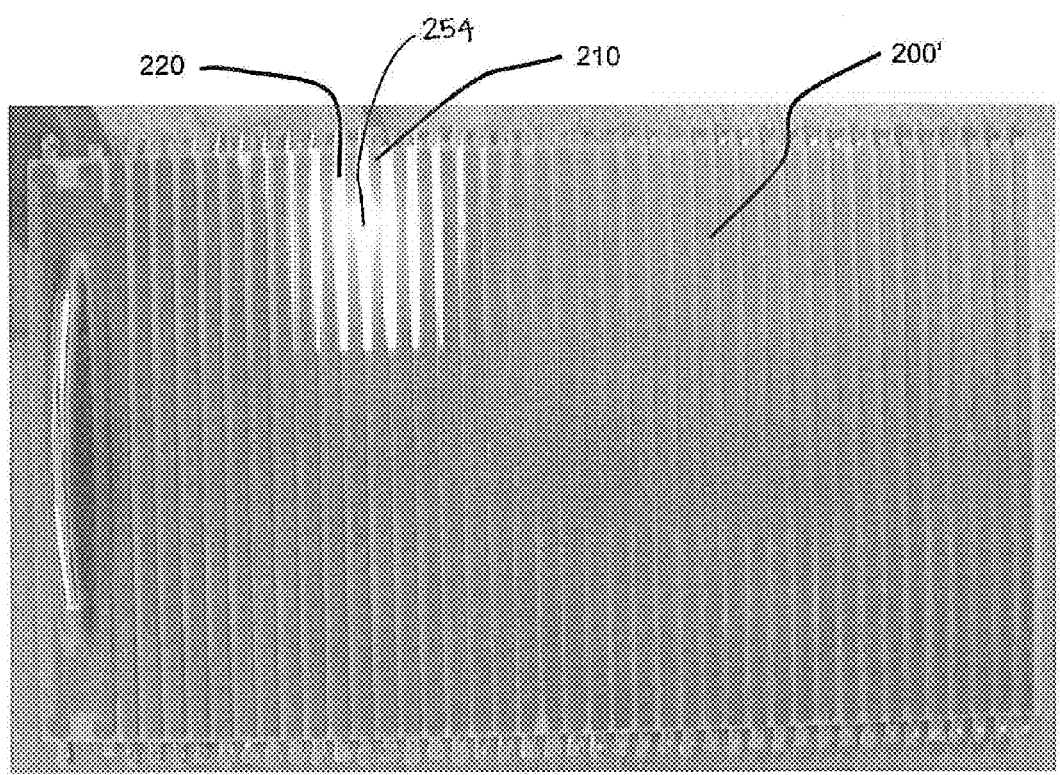
FIG. 7 is a photograph of a tambour door according to an exemplary embodiment with a light source behind the door.

FIGS. 5-7 show the translucent nature of the flexible component 200. FIGS. 5 and 6 show three separate exemplary embodiments of flexible components 200 according to this invention. As shown in FIGS. 5 and 6, the flexible components 200 can be any of various colors and designs, with at least a portion of each flexible component 200 being translucent. One exemplary embodiment of a flexible component 200' is shown in FIGS. 5-7 with opaque slats 210 and a translucent substrate 220, while the other flexible components 200 are shown in FIGS. 5 and 6 completely translucent. Being at least partially translucent, the flexible components 200 and 200' have different appearances in the different lighting configurations shown in FIGS. 5 and 6.

As shown in FIG. 7, due to the translucent nature of the substrate 220 of the flexible component 200', a light source 254 can be seen through the substrate 220 of the flexible component 200'. The light source 254 directs light through the translucent portion of the flexible component 200. Examples of the light source 254 include, but are not limited to, a light emitting diode, a high intensity discharge light, and a fluorescent light. The light source 254 can also include a light guide.

It should be appreciated that, while the flexible components 200 in FIGS. 5 and 6 are shown as being completely translucent, as outlined above, in various exemplary embodiments, the flexible component 200 may be partially opaque and/or may have an opaque layer that partially covers the surface of the flexible component 200.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:
1. A trim component for a vehicle comprising:
   a console including side walls presenting an interior space therebetween,
   each of said side walls having an upper contour defining an opening to said interior space, a flexible component disposed along said opening of said console, said flexible component including a plurality of slats and a substrate coupling said plurality of slats, said substrate of said flexible component including at least one of thermoplastic polyurethane (TPU) and thermoplastic elastomers (TPE), said slats of said flexible component including at least one of polypropylene (PP) and polycarbonate acrylonitrile butadiene styrene (PC/ABS), said substrate and said plurality of slats of said flexible component each being translucent, and a light source disposed in said console for directing light into said interior space and through said flexible component.

2. A trim component as set forth in claim 1 wherein said flexible component is transparent.

3. A trim component as set forth in claim 1 wherein at least a portion of said flexible component includes an opaque portion surrounding or adjacent to said substrate and said plurality of slats.

4. A trim component as set forth in claim 1 wherein said slats include polypropylene (PP).

5. A trim component as set forth in claim 1 wherein said substrate includes thermoplastic polyurethane (TPU).

6. A trim component as set forth in claim 1 wherein said slats include polypropylene (PP) and said substrate includes thermoplastic elastomer (TPE).

7. A trim component as set forth in claim 1 wherein each of said plurality of slats and said substrate are transparent.

8. A trim component as set forth in claim 1 wherein said light source includes at least one of a light emitting diode, a high intensity discharge light, and a fluorescent light.

9. A trim component as set forth in claim 1 wherein said flexible component includes at least one of a flexible layer, an ink layer, and a top layer.

10. A trim component as set forth in claim 9 wherein at least a portion of said flexible layer, said ink layer, or said top layer is translucent.

11. A trim component as set forth in claim 1 wherein said flexible component is an articulated door.

12. A trim component as set forth in claim 1 wherein said slats include polycarbonate acrylonitrile butadiene styrene (PC/ABS) and said substrate includes thermoplastic polyurethane (TPU).

\* \* \* \* \*